US012608654B2

(12) United States Patent (10) Patent No.: US 12,608,654 B2
Aquil et al. (45) Date of Patent: Apr. 21, 2026

(54) MEMORY DEVICE HIGH-SPEED INTERFACE TRAINING

(71) Applicant: QUALCOMM Incorporated, San Diego, CA (US)

(72) Inventors: Farrukh Aquil, San Diego, CA (US); Boris Dimitrov Andreev, San Diego, CA (US); Vinodh Mukundarajan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 171 days.

(21) Appl. No.: 18/408,323

(22) Filed: Jan. 9, 2024

(65) Prior Publication Data

US 2025/0225433 A1 Jul. 10, 2025

(51) Int. Cl.
*G06N 20/00* (2019.01)
*G06F 13/16* (2006.01)

(52) U.S. Cl.
CPC ............. *G06N 20/00* (2019.01); *G06F 13/16* (2013.01); *G06F 2213/0012* (2013.01)

(58) Field of Classification Search
CPC .. G06N 20/00; G06F 13/16; G06F 2213/0012
See application file for complete search history.

(56) References Cited

U.S. PATENT DOCUMENTS

| | | | | | |
|---|---|---|---|---|---|
| 10,581,434 | B1 * | 3/2020 | Finkbeiner | .......... | G11C 11/4096 |
| 11,742,007 | B2 * | 8/2023 | Bhatia | .................. | G11C 29/028 |
| | | | | | 365/189.011 |

| | | | | |
|---|---|---|---|---|
| 2008/0276133 | A1 | 11/2008 | Hadley et al. | |
| 2009/0248994 | A1 * | 10/2009 | Zheng | ..................... G06F 13/28 |
| | | | | 711/E12.001 |
| 2015/0179248 | A1 * | 6/2015 | Patil | ....................... G11C 7/222 |
| | | | | 365/233.1 |
| 2015/0370661 | A1 * | 12/2015 | Swanson | ............. G06F 13/4027 |
| | | | | 714/4.11 |
| 2017/0371560 | A1 * | 12/2017 | Macgarry | ............... G06F 11/22 |
| 2019/0172510 | A1 | 6/2019 | Kim et al. | |
| 2021/0081109 | A1 | 3/2021 | Wang | |

(Continued)

OTHER PUBLICATIONS

International Search Report and Written Opinion—PCT/US2024/053560—ISA/EPO—Jan. 31, 2025.

*Primary Examiner* — Henry Tsai
*Assistant Examiner* — Aurangzeb Hassan
(74) *Attorney, Agent, or Firm* — Harrity & Harrity, LLP

(57) ABSTRACT

Various aspects of the present disclosure generally relate to memory device high-speed interface training. In some aspects, a memory device may perform an initial training operation for a high-speed interface of the memory device. The memory device may detect, after a completion of the initial training operation for the high-speed interface, whether an aging counter associated with the high-speed interface has expired. The memory device may initiate one or more re-training operations for the high-speed interface based at least in part on whether the aging counter has expired. In some other aspects, the memory device may detect that the memory device is in an idle state. The memory device may perform a micro-training operation for a high-speed interface of the memory device in accordance with the memory device being in the idle state. Numerous other aspects are described.

29 Claims, 9 Drawing Sheets

600

610 — Perform an initial training operation for a high-speed interface of the memory device 620 — Detect, after a completion of the initial training operation for the high-speed interface, whether an aging counter associated with the high-speed interface has expired 630 — Initiate one or more re-training operations for the high-speed interface based at least in part on whether the aging counter has expired

(56)  References Cited

U.S. PATENT DOCUMENTS

| | | | |
|---|---|---|---|
| 2021/0089461 A1* | 3/2021 | Choi | ................... G06F 11/3058 |
| 2022/0291848 A1 | 9/2022 | Ware et al. | |
| 2023/0113953 A1 | 4/2023 | Pappu et al. | |
| 2023/0189357 A1* | 6/2023 | Yi | ......................... H04W 12/06 |
| | | | 370/329 |
| 2024/0112710 A1* | 4/2024 | Troia | ................. G06F 11/1448 |

* cited by examiner

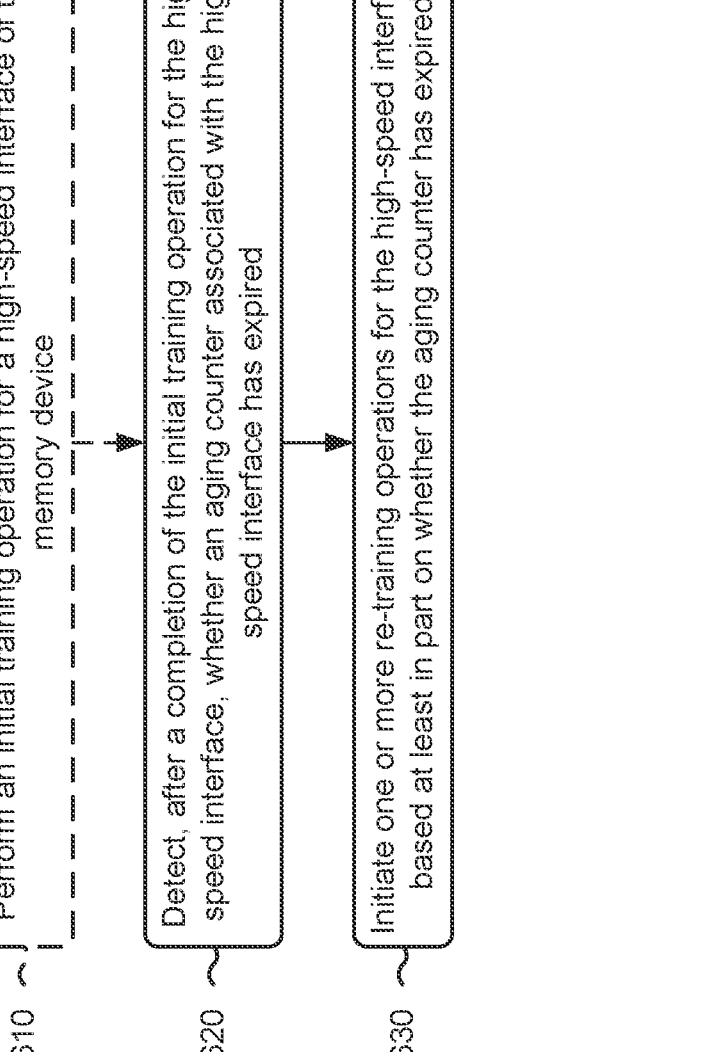

610 — Perform an initial training operation for a high-speed interface of the memory device 620 — Detect, after a completion of the initial training operation for the high-speed interface, whether an aging counter associated with the high-speed interface has expired 630 — Initiate one or more re-training operations for the high-speed interface based at least in part on whether the aging counter has expired

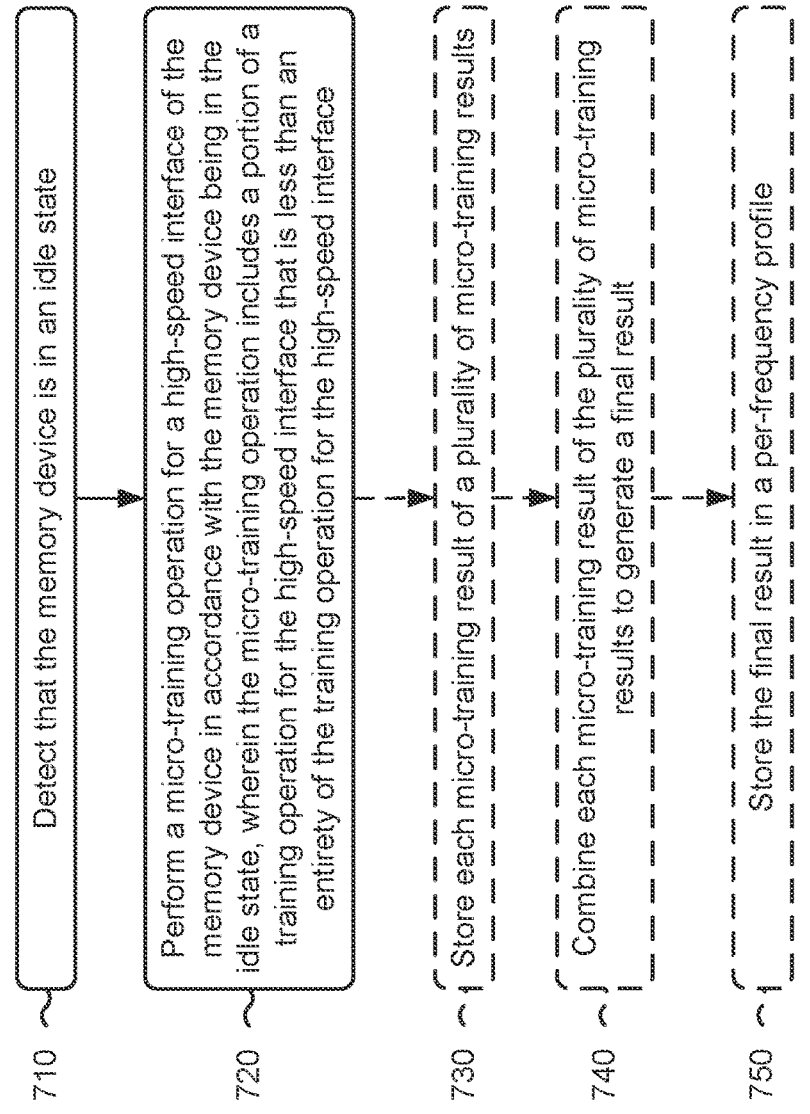

710 — Detect that the memory device is in an idle state

720 — Perform a micro-training operation for a high-speed interface of the memory device in accordance with the memory device being in the idle state, wherein the micro-training operation includes a portion of a training operation for the high-speed interface that is less than an entirety of the training operation for the high-speed interface 730 — Store each micro-training result of a plurality of micro-training results 740 — Combine each micro-training result of the plurality of micro-training results to generate a final result 750 — Store the final result in a per-frequency profile

MEMORY DEVICE HIGH-SPEED INTERFACE TRAINING

FIELD OF THE DISCLOSURE

Aspects of the present disclosure generally relate to wireless communication and specifically relate to techniques, apparatuses, and methods for memory device high-speed interface training.

BACKGROUND

A very-large-scale integration (VLSI) device is an electronic device that includes a large number of transistors integrated onto a single semiconductor chip. VLSI devices form the backbones of many electronic systems, such as computers, smartphones, household appliances, and advanced communication systems. An example VLSI device may include hundreds of thousands to millions of transistors, a silicon wafer, interconnects, and dielectric materials. Aging of VLSI devices may involve a gradual decline in performance and reliability of the VLSI device over time. VLSI aging may result from aging of hardware components of the VLSI device and/or aging of software components of the VLSI device. For example, hardware components (such as transistors) of the VLSI device may experience wear and tear, dielectric breakdown, oxidation, corrosion, and/or physical damage. Additionally, or alternatively, software (such as firmware drivers) of the VLSI device may become outdated, vulnerable to security threats, and/or may become inefficient at software utilization. VLSI devices may incorporate high-speed interfaces to enable high-speed data transfer between device components, such as between a processor and a memory of the VLSI device. The performance of the VLSI device may be influenced by the speed and efficiency of the high-speed interface.

SUMMARY

In some aspects, a method performed by a memory device includes detecting whether an aging counter associated with a high-speed interface of the memory device has expired; and initiating one or more re-training operations for the high-speed interface based at least in part on whether the aging counter has expired.

In some aspects, a method performed by a memory device includes detecting that the memory device is in an idle state; and performing a micro-training operation for a high-speed interface of the memory device in accordance with the memory device being in the idle state, wherein the micro-training operation includes a portion of a training operation for the high-speed interface that is less than an entirety of the training operation for the high-speed interface.

In some aspects, a memory device includes one or more memories; and one or more processors, coupled to the one or more memories, configured to: detect whether an aging counter associated with a high-speed interface of the memory device has expired; and initiate one or more re-training operations for the high-speed interface based at least in part on whether the aging counter has expired.

In some aspects, a memory device includes one or more memories; and one or more processors, coupled to the one or more memories, configured to: detect that the memory device is in an idle state; and perform a micro-training operation for a high-speed interface of the memory device in accordance with the memory device being in the idle state, wherein the micro-training operation includes a portion of a training operation for the high-speed interface that is less than an entirety of the training operation for the high-speed interface.

In some aspects, a non-transitory computer-readable medium storing a set of instructions includes one or more instructions that, when executed by one or more processors of a memory device, cause the memory device to: detect whether an aging counter associated with a high-speed interface of the memory device has expired; and initiate one or more re-training operations for the high-speed interface based at least in part on whether the aging counter has expired.

In some aspects, a non-transitory computer-readable medium storing a set of instructions includes one or more instructions that, when executed by one or more processors of a memory device, cause the memory device to: detect that the memory device is in an idle state; and perform a micro-training operation for a high-speed interface of the memory device in accordance with the memory device being in the idle state, wherein the micro-training operation includes a portion of a training operation for the high-speed interface that is less than an entirety of the training operation for the high-speed interface.

In some aspects, an apparatus includes means for detecting whether an aging counter associated with a high-speed interface of a memory device has expired; and means for initiating one or more re-training operations for the high-speed interface based at least in part on whether the aging counter has expired.

In some aspects, an apparatus includes means for detecting that the memory device is in an idle state; and means for performing a micro-training operation for a high-speed interface of the memory device in accordance with the memory device being in the idle state, wherein the micro-training operation includes a portion of a training operation for the high-speed interface that is less than an entirety of the training operation for the high-speed interface.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 6 is a flowchart of an example process associated with memory device high-speed interface training, in accordance with the present disclosure.

FIG. 7 is a flowchart of an example process associated with memory device high-speed interface training, in accordance with the present disclosure.

DETAILED DESCRIPTION

Figure 1:
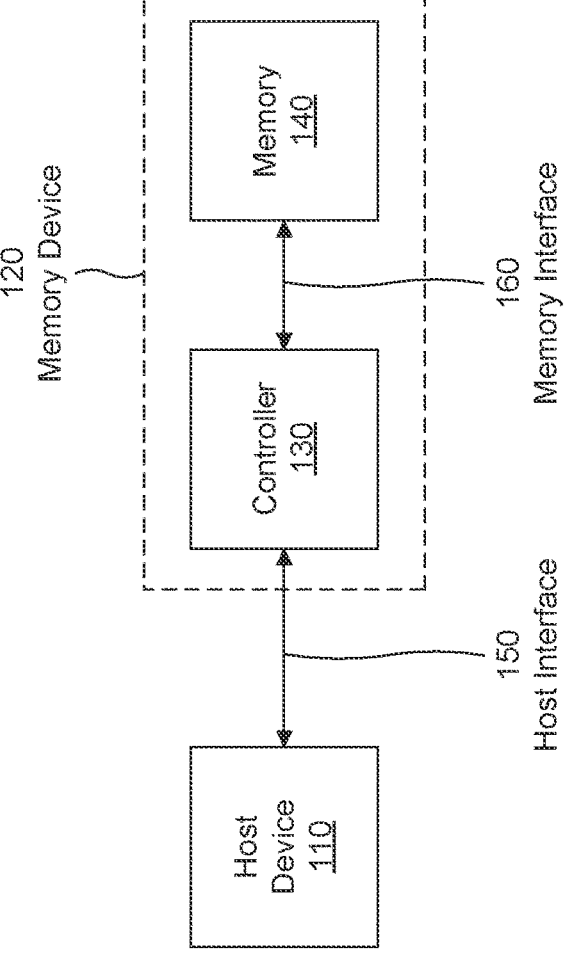
FIG. 1 is a diagram illustrating an example electronic device that may support memory device high-speed interface training, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A very-large-scale integration (VLSI) device is an electronic device that includes a large number of transistors integrated onto a single semiconductor chip. VLSI devices form the backbones of many electronic systems, such as computers, smartphones, household appliances, and advanced communication systems. An example VLSI device may include hundreds of thousands to millions of transistors, a silicon wafer, interconnects, and dielectric materials. Aging of VLSI devices may involve a gradual decline in performance and reliability of the VLSI device over time. VLSI aging May result from aging of hardware components of the VLSI device and/or aging of software components of the VLSI device. For example, hardware components (such as transistors) of the VLSI device may experience wear and tear, dielectric breakdown, oxidation, corrosion, and/or physical damage. Additionally, or alternatively, software (such as firmware drivers) of the VLSI device may become outdated, vulnerable to security threats, and/or may become inefficient at software utilization. In some examples, older software may not efficiently utilize newer hardware features, leading to sub-optimal performance of the VLSI device, while newer software may place demands on the hardware that exceeds the capabilities of the hardware. Scaling process technology, increased design complexity, and higher performance requirements may also contribute to faster aging of the VLSI device.

VLSI devices may incorporate high-speed interfaces to enable high-speed data transfer between device components, such as between a processor and a memory of the VLSI device. The performance of the VLSI device may be influenced by the speed and efficiency of the memory interface. For example, the interface may provide bandwidth for high-speed computing tasks without sacrificing an efficiency of the VLSI device and without increasing a power consumption or a thermal output of the VLSI device. In some examples, the high-speed interface may be a double data rate (DDR) interface. A DDR interface is a type of memory interface used in computing devices such as VLSI devices. DDR interfaces are characterized by the ability to transfer data both on the rising edge and the falling edge of a clock signal, thereby doubling the data rate compared to single data rate (SDR) interfaces. VLSI devices may employ a DDR interface (or any other type of high-speed interface) to improve data transfer between processing components and memory components of the VLSI device.

DDR re-training may be used to maintain integrity and reliability of the DDR interface as the VLSI device undergoes changes, for example, due to aging or other operational conditions. DDR re-training may include re-calibrating the timing and/or electrical parameters of the DDR memory interface. This re-calibration may increase a likelihood that data is correctly transferred over the DDR interface, for example, between the memory modules and the memory controller of the VLSI device. DDR training is typically performed a single time, for example, after an initial boot of the VLSI device but prior to any standard boot of the VLSI device. A time period for performing DDR training may be significant. For example, the time period for performing the DDR training may exceed ten seconds. Performing DDR training in the field (for example, after the initial boot) may negatively impact a performance of the VLSI device. For example, extended DDR training operations may cause a ten-second delay (or longer) each time that the DDR training is to be performed. This may negatively impact a performance of the VLSI device and may negatively impact a user experience for a user of the VLSI device.

Various aspects relate generally to memory device high-speed interface training. In some aspects, an initial boot may be performed for a memory device. The initial boot may be, for example, a factory boot of the memory device. The memory device may include a high-speed interface for transferring data between one or more processors of the memory device and one or more memories of the memory device. In some examples, the memory device may be a VLSI device and the high-speed interface may be a DDR interface. The memory device may perform an initial training operation for the high-speed interface after a completion of the initial boot. For example, the memory device may perform an initial DDR training operation after a completion of the factory boot. The memory device may detect, after a completion of the initial training operation for the high-speed interface, whether an aging counter associated with the high-speed interface has expired. The memory device may initiate one or more re-training operations for the high-speed interface based at least in part on whether the aging counter has expired. For example, the memory device may initiate a DDR re-retraining operation based at least in part on detecting that the aging counter has expired, or may refrain from initiating a DDR re-training operation based at least in part on detecting that the aging counter has not expired. The memory device may perform the one or more re-training operations using a micro-controller associated with the memory device and/or using a hardware built-in self-test engine associated with the memory device. The memory device may detect that the aging counter has expired and may initiate the high-speed interface re-training operation in accordance with a time interval and/or in accordance with a standard boot of the memory device. In some other aspects, the memory device may detect that the memory device is in an idle state. The idle state may be associated with a time period during which the memory device is not transmitting data to another device or receiving data from another device. For example, the idle state may be associated with a time period that is outside of a mission mode of the memory device. The memory device may perform a micro-training operation for the high-speed interface of the memory device in accordance with the memory device being in the idle state. The micro-training operation may include a portion of a training operation for the high-speed interface that is less than an entirety of the training operation for the high-speed interface. In some examples, the memory device may perform a plurality of micro-training operations for a plurality of training categories associated with the high-speed interface and/or for a plurality of frequencies associated with transferring data using the high-speed interface. The memory device may combine a plurality of micro-training operations performed by the memory device during one or more idle states and may save a plurality of results associated with the plurality of micro-training operations in a register associated with the high-speed interface.

Particular aspects of the subject matter described in this disclosure can be implemented to realize one or more of the following potential advantages. In some examples, the described techniques can be used to reduce a training time for memory device high-speed interfaces. For example, by initiating one or more re-training operations for the high-speed interface based at least in part on the aging counter, the described techniques can be used to enable the memory device to perform one or more re-training operations in accordance with an interval and/or in accordance with a standard boot of the memory device using a micro-controller associated with the memory device and/or using a hardware built-in self-test engine associated with the memory device. Additionally, or alternatively, by performing a plurality of micro-training operations, the described techniques can be used to enable the memory device to complete a re-training operation for the high-speed interface over a plurality of idle periods associated with the memory device. In some examples, by initiating one or more re-training operations for the high-speed interface based at least in part on the aging counter and/or by performing the micro-training operations, the described techniques can be used to perform high-speed interface re-training in the field after an initial boot (for example, after a factory boot) of the memory device. In some examples, by initiating the one or more re-training operations for the high-speed interface based at least in part on the aging counter and/or by performing the micro-training operations, the described techniques can be used to mitigate an aging of the memory device and to increase a lifespan of the memory device without disrupting a user experience. These example advantages, among others, are described in more detail below.

FIG. 1 is a diagram illustrating an example electronic device 100 that may support memory device high-speed interface training, in accordance with the present disclosure. The electronic device 100 may include one or more devices, apparatuses, and/or components for performing operations described herein. For example, the electronic device 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The electronic device 100 may be any suitable electronic device configured to store data in memory. For example, the electronic device 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), or the like.

The memory device 120 may be any electronic device configured to store data in memory. In some aspects, the memory device 120 may be an electronic device configured to store data temporarily in volatile memory. For example, the memory device 120 may be a random-access memory (RAM) device, such as a dynamic RAM (DRAM) device or a static RAM (SRAM) device. In this case, the memory 140 may include volatile memory that requires power to maintain stored data and that loses stored data after the memory device 120 is powered off. For example, the memory 140 may include one or more latches and/or RAM, such as DRAM and/or SRAM. In some aspects, the memory 140 may include non-volatile memory configured to maintain stored data after the memory device 120 is powered off, such as NAND memory or NOR memory. For example, the non-volatile memory may store persistent firmware or other instructions for execution by the controller 130.

The controller 130 may be any device configured to communicate with the host device 110 (e.g., via the host interface 150) and the memory 140 (e.g., via the memory interface 160). Additionally, or alternatively, the controller 130 may be configured to control operations of the memory device 120 and/or the memory 140. For example, the controller 130 may include control logic, a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be a solid state drive (SSD)

controller, and a low-level controller may be a non-volatile memory controller (e.g., a NAND controller) or a volatile memory controller (e.g., a DRAM controller). In some aspects, a set of operations described herein as being performed by the controller 130 may be performed by a single controller (e.g., the entire set of operations may be performed by a single high-level or low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, a Non-Volatile Memory Express (NVMe) interface, a universal serial bus (USB) interface, a Universal Flash Storage (UFS) interface, and/or an embedded multimedia card (eMMC) interface.

The memory interface 160 enables communication between the controller 130 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some aspects, as described in more detail elsewhere herein, one or more systems, devices, apparatuses, components, and/or controllers of FIG. 1 may be configured to perform an initial training operation for a high-speed interface of the memory device; detect, after a completion of the initial training operation for the high-speed interface, whether an aging counter associated with the high-speed interface has expired; and initiate one or more re-training operations for the high-speed interface based at least in part on whether the aging counter has expired. In some other aspects, as described in more detail elsewhere herein, one or more systems, devices, apparatuses, components, and/or controllers of FIG. 1 may be configured to detect that the memory device is in an idle state; and perform a micro-training operation for a high-speed interface of the memory device in accordance with the memory device being in the idle state, wherein the micro-training operation includes a portion of a training operation for the high-speed interface that is less than an entirety of the training operation for the high-speed interface. Additionally, or alternatively, one or more systems, devices, apparatuses, components, and/or controllers of FIG. 1 may be configured to perform one or more other operations described herein.

As indicated above, FIG. 1 is provided as an example. Other examples may differ from what is described with regard to FIG. 1.

Figure 2:
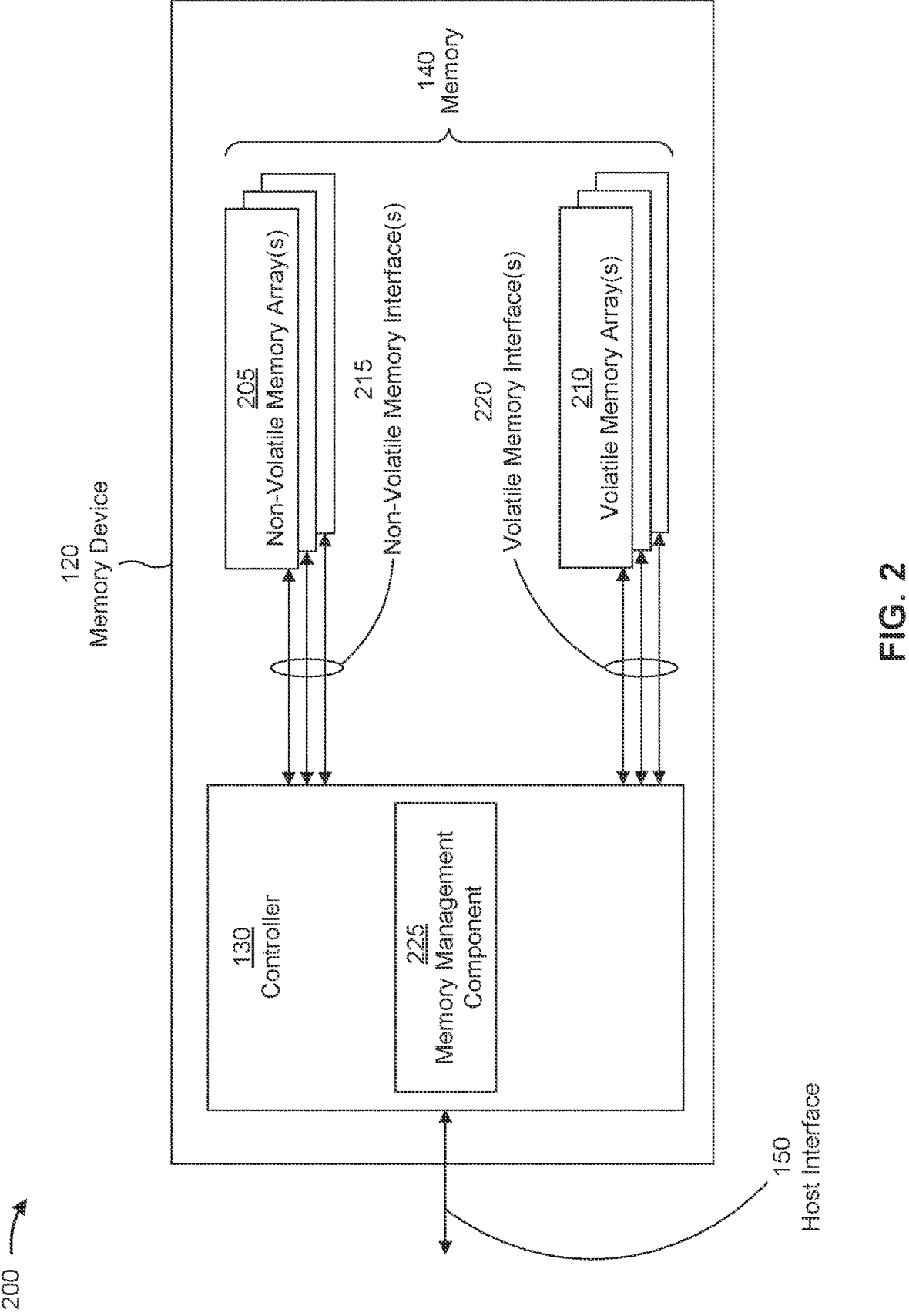
FIG. 2 is a diagram illustrating an example of components included in a memory device that may support memory device high-speed interface training, in accordance with the present disclosure.

FIG. 2 is a diagram illustrating an example 200 of components included in a memory device 120 that may support memory device high-speed interface training, in accordance with the present disclosure. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute the one or more instructions stored in the memory 140. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some aspects, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

One or more devices or components shown in FIG. 2 may be configured to perform operations described herein, such as one or more operations and/or methods described in connection with FIGS. 4, 5A-5B, 6, and/or 7. For example, the controller 130, the memory management component 225, may be configured to perform one or more operations and/or methods for the memory device 120.

In some aspects, the memory device 120 may include means for performing an initial training operation for a high-speed interface of the memory device; means for detecting, after a completion of the initial training operation for the high-speed interface, whether an aging counter associated with the high-speed interface has expired; and means for initiating one or more re-training operations for the high-speed interface based at least in part on whether the aging counter has expired. Additionally, or alternatively, the memory device 120 may include means for detecting that the memory device is in an idle state; and means for performing a micro-training operation for a high-speed interface of the memory device in accordance with the memory device being in the idle state, wherein the micro-training operation includes a portion of a training operation for the high-speed interface that is less than an entirety of the training operation for the high-speed interface. In some aspects, the means for the memory device 120 to perform processes and/or operations described herein may include one or more components shown in FIG. 2, such as controller 130 and/or memory management component 225, among other examples.

As indicated above, FIG. 2 is provided as an example. Other examples may differ from what is described with regard to FIG. 2.

Figure 3:
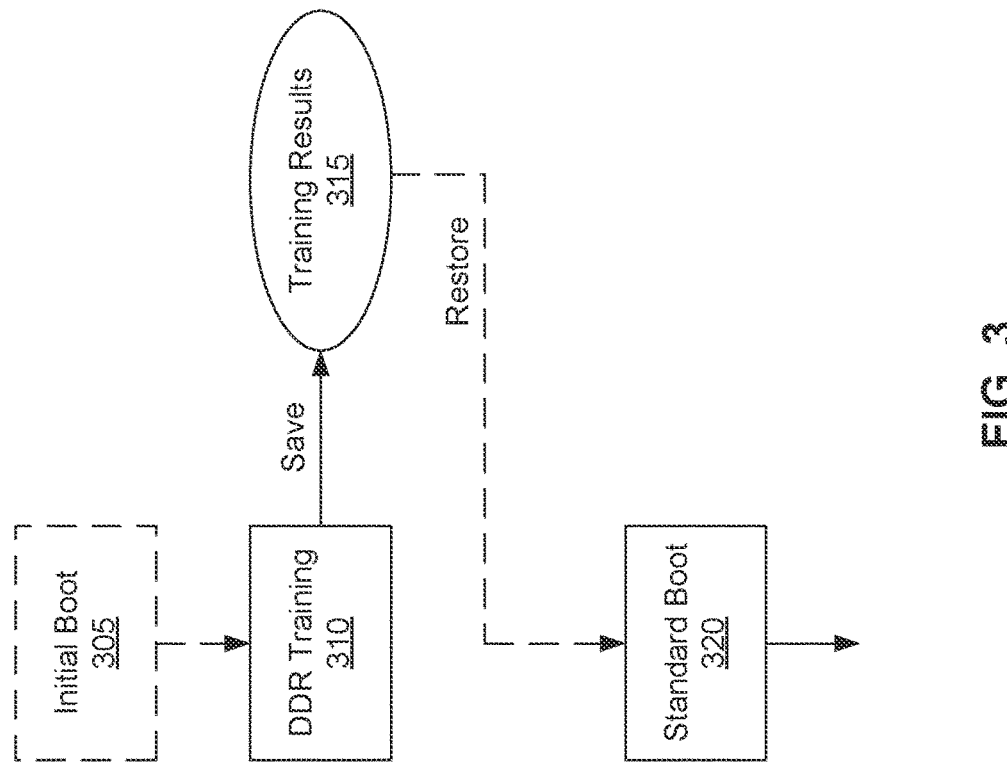
FIG. 3 is a diagram illustrating an example of a memory device boot process, in accordance with the present disclosure.

FIG. 3 is a diagram illustrating an example 300 of a memory device boot process, in accordance with the present disclosure.

Memory devices may incorporate high-speed interfaces to enable high-speed data transfer between device components, such as between a processor and a memory of the memory device. The performance of the memory device may be influenced by the speed and efficiency of the memory interface. For example, the interface may provide bandwidth for high-speed computing tasks without sacrificing an efficiency of the memory device and without increasing a power consumption or a thermal output of the memory device. In some examples, the memory device may be a VLSI device and the high-speed interface may be a DDR interface. DDR interfaces are characterized by the ability to transfer data both on the rising edge and the falling edge of a clock signal, thereby doubling the data rate compared to SDR interfaces. VLSI devices may employ a DDR interface (or any other type of high-speed interface) to improve data transfer between processing components and memory components of the VLSI device.

DDR re-training may be used to maintain integrity and reliability of the DDR interface as the VLSI device undergoes changes, for example, due to aging or other operational conditions. DDR re-training may include re-calibrating the timing and/or electrical parameters of the DDR memory interface. This re-calibration may increase a likelihood that data is correctly transferred over the DDR interface, for example, between the memory modules and the memory controller. In some examples, DDR re-training may be used to recover a portion (for example, a majority) of a data eye and to mitigate the aging effects of the VLSI device. A data eye is a graphical representation of data that can be used to evaluate a quality of the data. For example, the data eye may be used to analyze and troubleshoot signal integrity in high-speed data transmissions, such as transmissions that occur over the DDR interface. In some cases, aging of the VLSI device may cause duty cycle distortion, thereby shrinking the DDR data eye and causing functional failures. In one example, a portion (for example, 82%) of DDR re-training may be used for post-processing operations, another portion (for example, 7%) of the DDR re-training may be used for physical layer (PHY) register access operations, and another portion (for example, 11%) of the DDR re-training may be used for peripheral component interconnect (PCI) extension for instrumentation (PXI) and DRAM access operations.

As shown in the example 300 and by reference number 305, an initial boot may be performed for a memory device such as a VLSI device. In some examples, the initial boot may be a factory boot. Performing the initial boot may include initializing the VLSI device with settings and firmware to improve quality assurance and reduce a likelihood of VLSI device errors. In some examples, the VLSI device may include a DDR interface for enabling communications between one or more processing components of the VLSI device and one or more memory components of the VLSI device. In some other examples, the VLSI device may include another type of high-speed interface. As shown by reference number 310, DDR training may be performed for the DDR interface. DDR training may include calibrating the timing and/or electrical parameters of the DDR interface. As shown by reference number 315, training results may be obtained for the DDR interface. The training results may include one or more results of the DDR training operation and may be stored in a memory of the VLSI device, such as in a flash memory included in the VLSI device. As shown by reference number 320, the VLSI device may perform a standard boot. The standard boot may be performed in accordance with restoring one or more conditions of the DDR interface and/or the VLSI device based at least in part on the training results that are stored in the flash memory. In some examples, the standard boot may be any boot that is not the initial boot, such as a regular boot that is performed by a user of the VLSI device after the factory boot.

DDR training is typically performed a single time, for example, after the initial boot of the VLSI device but prior to any standard boot of the VLSI device. A time period for performing DDR training may be significant. For example, the time period for performing the DDR training may exceed ten seconds. Performing DDR training in the field (for example, after the initial boot) may negatively impact a performance of the VLSI device. For example, extended DDR training operations may cause a ten-second delay (or longer) each time that the DDR training is to be performed. This may negatively impact a performance of the VLSI device and may negatively impact a user experience for a user of the VLSI device.

As indicated above, FIG. 3 is provided as an example. Other examples may differ from what is described with regard to FIG. 3.

Figure 4:
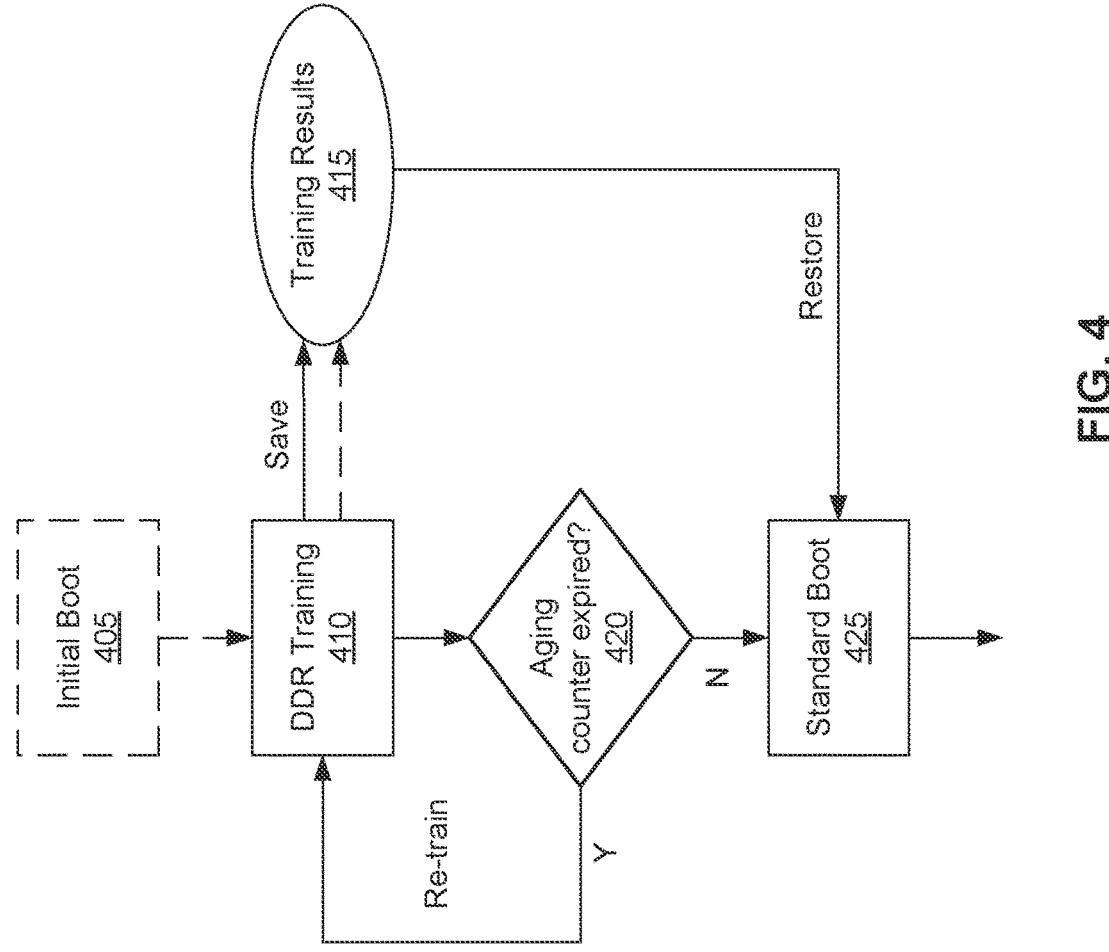
FIG. 4 is a diagram illustrating an example of memory device high-speed interface training using an aging counter, in accordance with the present disclosure.

FIG. 4 is a diagram illustrating an example 400 of memory device high-speed interface training using an aging counter, in accordance with the present disclosure.

As shown by reference number 405, an initial boot may be performed for a memory device. The memory device may be the memory device 120 and/or may include one or more features of the memory device 120 described herein. In some examples, the memory device may be a VLSI memory device. However, the memory device may be any type of memory device that includes a high-speed interface. In some examples, the initial boot for the memory device may be a factory boot for the memory device. The initial boot for the memory device may include initializing the memory device with settings and firmware to improve quality assurance and reduce a likelihood of memory device errors.

As shown by reference number 410, high-speed interface training may be performed for a high-speed interface of the memory device. In some aspects, the high-speed interface of the memory device may be a DDR interface. In this case, the high-speed interface training may be (or may include) DDR training. However, the high-speed interface of the memory device may be any type of high-speed interface that enables data transfer at the memory device, and the high-speed interface training may be any type of high-speed interface training. In some aspects, a DDR training operation may include calibrating the timing and/or electrical parameters of the DDR interface. In some aspects, the DDR training operation may be an initial DDR training operation that occurs a single time after an initial boot of the memory device.

As shown by reference number 415, training results associated with the DDR training operation may be stored in a memory of the memory device. In some examples, the memory may be a flash memory. For example, the memory device may obtain results of the DDR training operation and may store the results in a flash memory of the memory device.

As shown by reference number 420, the memory device may detect whether an aging counter has expired. In some aspects, the aging counter may be configured to expire in accordance with a time interval. For example, the aging counter may expire every N months (such as every three months). Additionally, or alternatively, the aging counter may be configured to expire in accordance with a standard boot of the memory device. For example, the aging counter may expire each time that a standard boot is initiated for the memory device. If the memory device detects that the aging counter has expired, the memory device may initiate a DDR re-training operation. For example, the memory device may perform a subsequent DDR training operation to re-train the DDR interface of the memory device. The memory device may store the results of the re-training operation in a memory of the memory device, such as in the flash memory of the memory device. Alternatively, if the memory device detects that the aging counter has not expired, the memory device may initiate a standard boot operation.

In some aspects, the DDR re-training operation may be performed using a micro-controller of the memory device. Additionally, or alternatively, the DDR re-training operation may be performed using a hardware built-in self-test (BIST) engine of the memory device. This may enable the DDR re-training operation to be performed in accordance with a target user experience for a product boot time. For example, performing the DDR re-training using the micro-controller of the memory device or the hardware BIST engine of the memory device may enable the DDR re-training operation to be performed in the field in less than two seconds.

As shown by reference number 425, a standard boot may be performed for the memory device. In some aspects, the memory device may be configured to restore the training results stored in the flash memory of the memory device in accordance with performing the standard boot for the memory device. In the example where a DDR re-training operation was performed (for example, in accordance with the aging counter being expired), the standard boot may be performed using the results of the DDR re-training operation that are stored in the flash memory of the memory device.

Alternatively, if a re-training operation was not performed (for example, in accordance with the aging counter not being expired), the standard boot may be performed using the results of the initial DDR training operation.

In some aspects, multiple DDR re-training operations may be performed. For example, the memory device may detect a first expiration of the aging counter, and may perform a first DDR re-training operation for the DDR interface. After storing the results of the first DDR re-training operation in the flash memory of the memory device, the memory device may detect a second expiration of the aging counter. For example, the aging counter may expire again before a standard boot of the memory device is performed. Alternatively, the aging counter may expire in accordance with a standard boot being initiated for the memory device. The memory device may perform a second DDR re-training operation for the DDR interface, and may store the results of the second DDR re-training operation in the flash memory of the memory device. In some aspects, the results of the second DDR re-training operation may be stored with the results of the first DDR re-training operation. In some other aspects, the results of the second DDR re-training operation may overwrite the results of the first DDR re-training operation. The memory device may perform a standard boot using the results from a most recent DDR training operation or DDR re-training operation.

As indicated above, FIG. 4 is provided as an example. Other examples may differ from what is described with regard to FIG. 4.

Figure 5A:
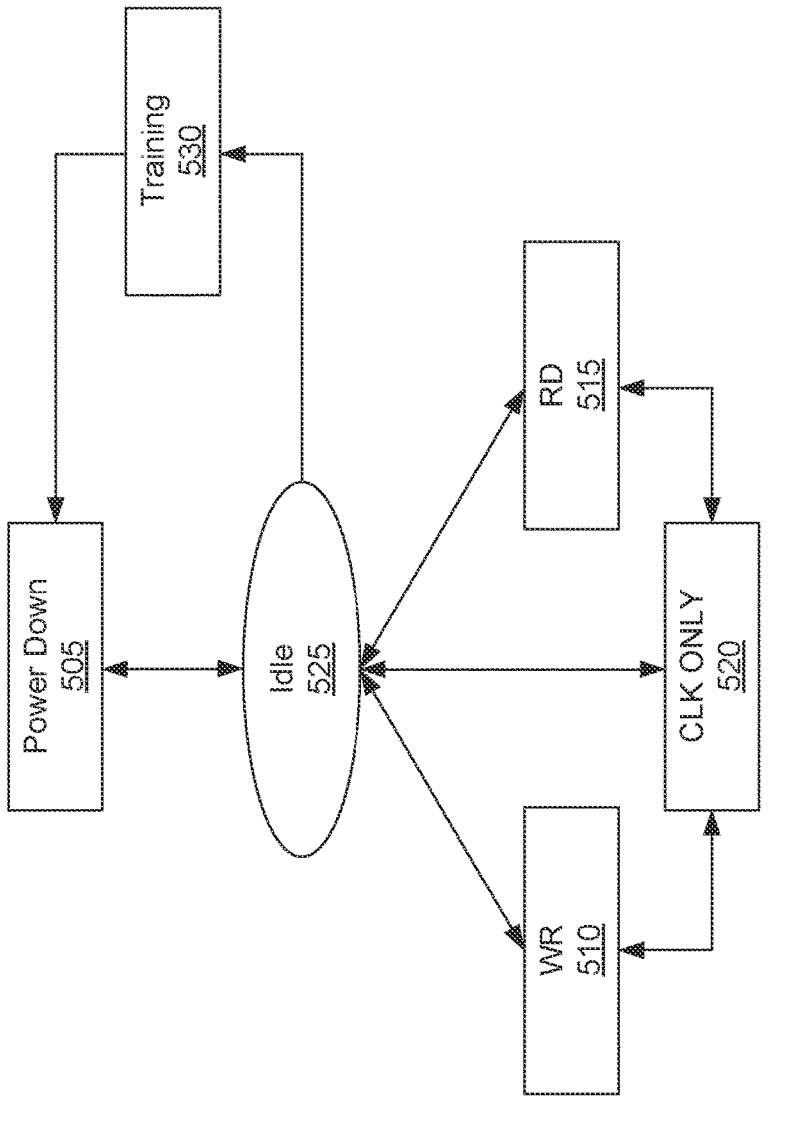
FIGS. 5A-5B are diagrams illustrating examples of memory device high-speed interface training using micro-training operations, in accordance with the present disclosure.
Figure 5B:
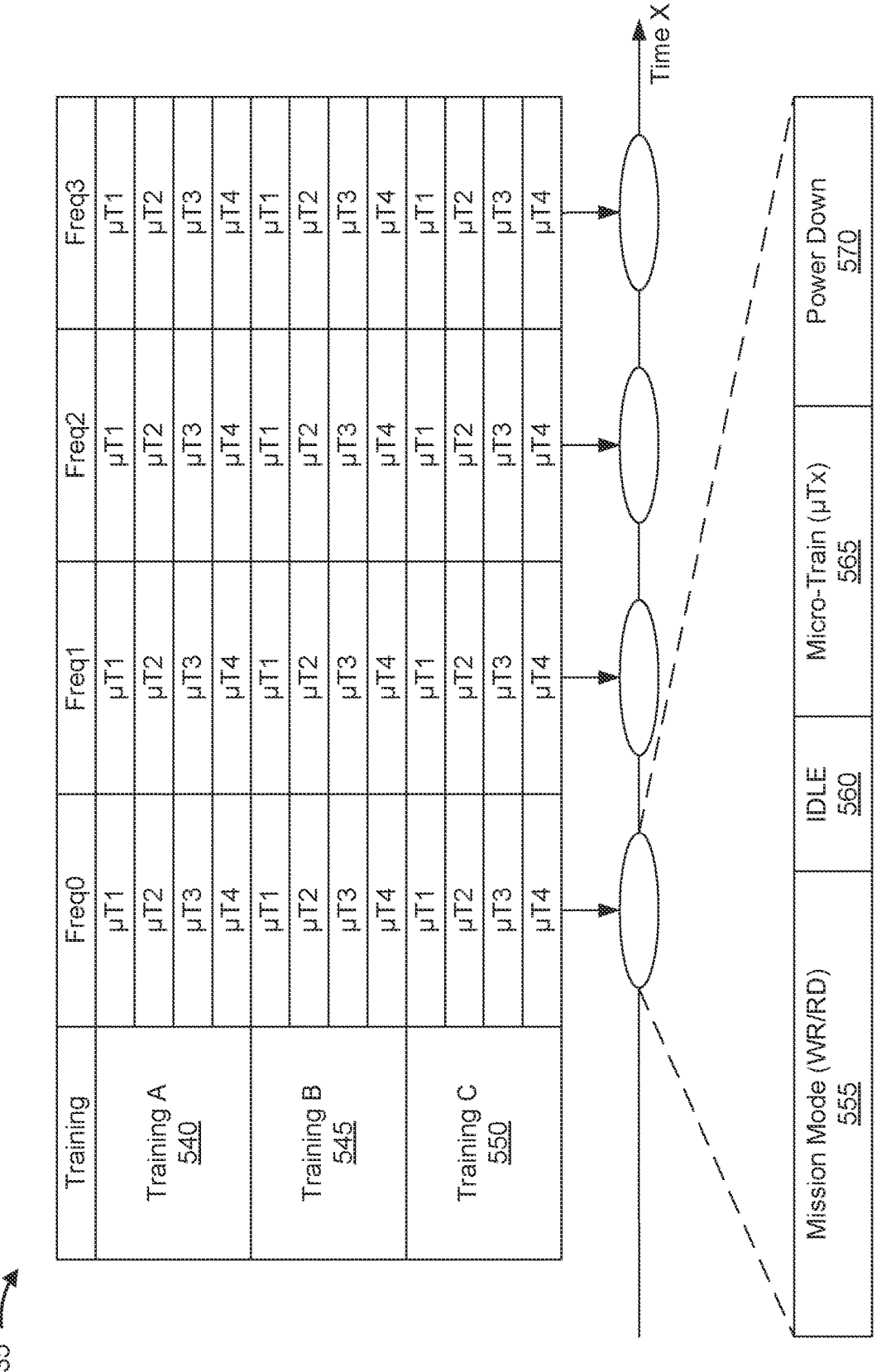

FIGS. 5A-5B are diagrams illustrating examples of memory device high-speed interface training using micro-training operations, in accordance with the present disclosure. As described herein, high-speed interface training may be performed for a high speed interface of the memory device. In some aspects, the high-speed interface may be a DDR interface. In some other aspects, the high-speed interface may be another type of high-speed interface.

As shown in FIG. 5A and example 500, the memory device may be configured to operate in one or more states. The memory device may be in a power down state 505 in accordance with the memory device being in an off condition. The memory device may be in a write (WR) state 510 in accordance with the memory device performing one or more write operations. The memory device may be in a read (RD) state 515 in accordance with the memory device performing one or more read operations. The memory device may be in a clock (CLK) only state 520 in accordance with the memory device running a clock associated with the memory device and not performing any read or write operations. The memory device may be in an idle state 525 in accordance with the memory device not performing any read operations and not performing any write operations. In some examples, the idle state of the memory device may correspond to a time that the memory device is not transmitting data to another device and is not receiving data from the other device. Additionally, or alternatively, the idle state of the memory device may correspond to a state of the memory device that is outside of a mission mode of the memory device. The memory device may be in a training state 530 in accordance with a high-speed interface of the memory device being trained, for example, using one or more micro-training operations. The training state of the memory device may occur after a mission mode state of the memory device but prior to a power down state of the memory device.

As shown in FIG. 5B and example 535, the high-speed interface training may include a plurality of micro-training operations. For example, rather than performing an entirety of the DDR training (or DDR re-training) operation at a single time, the memory device may perform a plurality of micro-training operations. In some aspects, the memory device may perform one or more micro-training operations during each idle state of a plurality of idle states of the memory device, and may combine the plurality of micro-training operations to form an entirety of the DDR training (or DDR re-training) operation. In some aspects, the plurality of micro-training operations may be performed for a plurality of high-speed interface training categories. For example, high-speed interface training may be separated into Training A 540 (which may include, for example, a duty cycle calibration operating), Training B 545 (which may include, for example, a write training operation), and Training C 550 (which may include, for example, a read training operation). Additionally, or alternatively, the plurality of micro-training operations may be performed for a plurality of frequencies associated with the high-speed interface. For example, high-speed interface training may be performed separately for a first frequency (freq0), a second frequency (freq1), a third frequency (freq2), and a fourth frequency (freq3) used by the high-speed interface. As shown in the example 535, a first micro-training operation ($\mu$T1), a second micro-training operation ($\mu$T2), a third micro-training operation ($\mu$T3), and a fourth micro-training operation ($\mu$T4) may be performed for each training category and for each frequency associated with the high-speed interface. Each micro-training operation of the plurality of micro-training operations may be performed during an idle state of the memory device. For example, the memory device may perform one or more micro-training operations during a particular idle state of the memory device. A plurality of micro-training operations performed over a plurality of idle states of the memory device may be combined by the memory device to form a complete DDR re-training operation. As described herein, the training results associated with the DDR re-training operation may be stored in a flash memory of the memory device and may be accessed during a standard boot of the memory device.

In some aspects, performing the plurality of micro-training operations may include performing the plurality of micro-training operations outside of a mission mode 555 of the memory device. The mission mode 555 of the memory device may include, for example, one or more write operations performed during a write state of the memory device and one or more read operations performed during a read state of the memory device. In some aspects, the memory device may detect an idle state 560 of the memory device. As described herein, the idle state of the memory device may correspond to a time that the memory device is not transmitting data to another device and is not receiving data from the other device, and/or may correspond to a state of the memory device that is outside of a mission mode of the memory device. The memory device may perform one or more micro-training operations ($\mu$Tx) 565 in accordance with detecting that the memory device is in the idle state. In some aspects, the memory device may initiate a power down state 570 after a completion of the one or more micro-training operations.

As indicated above, FIGS. 5A-5B are provided as examples. Other examples may differ from what is described with regard to FIGS. 5A-5B.

FIG. 6 is a flowchart of an example process 600 associated with memory device high-speed interface training, in accordance with the present disclosure. In some implementations, one or more process blocks of FIG. 6 are performed by a memory device (e.g., memory device 120). In some implementations, one or more process blocks of FIG. 6 are performed by another device or a group of devices separate from or including the memory device. Additionally, or alternatively, one or more process blocks of FIG. 6 may be performed by one or more components of system 800, such as CPU 810, processor 812, and/or training controller 814.

As shown in FIG. 6, process 600 may include performing an initial training operation for a high-speed interface of the memory device (block 610). For example, the memory device may perform an initial training operation for a high-speed interface of the memory device, as described above.

As further shown in FIG. 6, process 600 may include detecting, after a completion of the initial training operation for the high-speed interface, whether an aging counter associated with the high-speed interface has expired (block 620). For example, the memory device may detect, after a completion of the initial training operation for the high-speed interface, whether an aging counter associated with the high-speed interface has expired, as described above.

As further shown in FIG. 6, process 600 may include initiating one or more re-training operations for the high-speed interface based at least in part on whether the aging counter has expired (block 630). For example, the memory device may initiate one or more re-training operations for the high-speed interface based at least in part on whether the aging counter has expired, as described above.

Process 600 may include additional implementations, such as any single implementation or any combination of implementations described below and/or in connection with one or more other processes described elsewhere herein.

In a first implementation, process 600 includes storing one or more results of the one or more re-training operations in a flash memory of the memory device.

In a second implementation, alone or in combination with the first implementation, process 600 includes performing a standard boot for the memory device using the one or more results of the one or more re-training operations.

In a third implementation, alone or in combination with one or more of the first and second implementations, initiating the one or more re-training operations based at least in part on whether the aging counter has expired comprises performing a re-training operation for the high-speed interface based at least in part on detecting that the aging counter has expired.

In a fourth implementation, alone or in combination with one or more of the first through third implementations, process 600 includes detecting, after a completion of the re-training operation, that the aging counter has expired, and performing another re-training operation for the high-speed interface based at least in part on detecting that the aging counter has expired.

In a fifth implementation, alone or in combination with one or more of the first through fourth implementations, the initial training operation for the high-speed interface is performed after an initial boot of the memory device.

In a sixth implementation, alone or in combination with one or more of the first through fifth implementations, the one or more re-training operations are performed using a micro-controller associated with the memory device.

In a seventh implementation, alone or in combination with one or more of the first through sixth implementations, the one or more re-training operations are performed using a hardware built-in self-test engine associated with the memory device.

In an eighth implementation, alone or in combination with one or more of the first through seventh implementations, detecting whether the aging counter has expired comprises checking whether the aging counter has expired in accordance with an interval.

In a ninth implementation, alone or in combination with one or more of the first through eighth implementations, detecting whether the aging counter has expired comprises checking whether the aging counter has expired in accordance with a standard boot for the memory device.

In a tenth implementation, alone or in combination with one or more of the first through ninth implementations, the high-speed interface is a double data rate (DDR) interface.

In an eleventh implementation, alone or in combination with one or more of the first through tenth implementations, the initial training operation is a DDR training operation, and the one or more re-training operations are one or more DDR re-training operations.

In a twelfth implementation, alone or in combination with one or more of the first through eleventh implementations, the memory device is a very-large-scale integration memory device.

In a thirteenth implementation, alone or in combination with one or more of the first through twelfth implementations, a re-training operation of the one or more re-training operations is performed in-field over a time period that is less than two seconds.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

FIG. 7 is a flowchart of an example process 700 associated with memory device high-speed interface training, in accordance with the present disclosure. In some implementations, one or more process blocks of FIG. 7 are performed by a memory device (e.g., memory device 120). In some implementations, one or more process blocks of FIG. 7 are performed by another device or a group of devices separate from or including the memory device. Additionally, or alternatively, one or more process blocks of FIG. 7 may be performed by one or more components of system 800, such as CPU 810, processor 812, and/or training controller 814.

As shown in FIG. 7, process 700 may include detecting that the memory device is in an idle state (block 710). For example, the memory device may detect that the memory device is in an idle state, as described above.

As further shown in FIG. 7, process 700 may include performing a micro-training operation for a high-speed interface of the memory device in accordance with the memory device being in the idle state, wherein the micro-training operation includes a portion of a training operation for the high-speed interface that is less than an entirety of the training operation for the high-speed interface (block 720). For example, the memory device may perform a micro-training operation for a high-speed interface of the memory device in accordance with the memory device being in the idle state, wherein the micro-training operation includes a portion of a training operation for the high-speed interface that is less than an entirety of the training operation for the high-speed interface, as described above.

As further shown in FIG. 7, process 700 may include storing each micro-training result of a plurality of micro-training results (block 730). For example, the memory device may store each micro-training result of the plurality of micro-training results, as described above.

As further shown in FIG. 7, process 700 may include combining each micro-training result of the plurality of micro-training results to generate a final result (block 740). For example, the memory device may combine each micro-training result of the plurality of micro-training results to generate a final result, as described above.

As further shown in FIG. 7, process 700 may include storing the final result in a per-frequency profile (block 750). For example, the memory device may store the final result in a per-frequency profile, as described above.

Process 700 may include additional implementations, such as any single implementation or any combination of implementations described below and/or in connection with one or more other processes described elsewhere herein.

In a first implementation, performing the micro-training operation comprises performing a plurality of micro-training operations for a plurality of training categories associated with the high-speed interface.

In a second implementation, alone or in combination with the first implementation, the plurality of training categories associated with the high-speed interface include a duty cycle calibration category, a write training category, and a read training category.

In a third implementation, alone or in combination with one or more of the first and second implementations, performing the micro-training operation comprises performing a plurality of micro-training operations for a plurality of frequencies associated with transferring data using the high-speed interface.

In a fourth implementation, alone or in combination with one or more of the first through third implementations, the idle state is associated with a time period that is outside of a mission mode of the memory device.

In a fifth implementation, alone or in combination with one or more of the first through fourth implementations, the idle state is associated with a time period during which the memory device is not transmitting data to another device or receiving data from another device.

In a sixth implementation, alone or in combination with one or more of the first through fifth implementations, process 700 includes combining a plurality of micro-training operations performed by the memory device during one or more idle states.

In a seventh implementation, alone or in combination with one or more of the first through sixth implementations, process 700 includes saving a plurality of results associated with the plurality of micro-training operations in a register associated with the high-speed interface.

In an eighth implementation, alone or in combination with one or more of the first through seventh implementations, the micro-training operation is associated with a re-training of the memory device that occurs after an initial boot of the memory device.

In a ninth implementation, alone or in combination with one or more of the first through eighth implementations, the high-speed interface is a DDR interface.

In a tenth implementation, alone or in combination with one or more of the first through ninth implementations, the memory device is a very-large-scale integration memory device.

In an eleventh implementation, alone or in combination with one or more of the first through tenth implementations, the micro-training operation is performed using a micro-controller associated with the memory device.

In a twelfth implementation, alone or in combination with one or more of the first through eleventh implementations, the micro-training operation is performed using a hardware built-in self-test engine associated with the memory device.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

Figure 8:
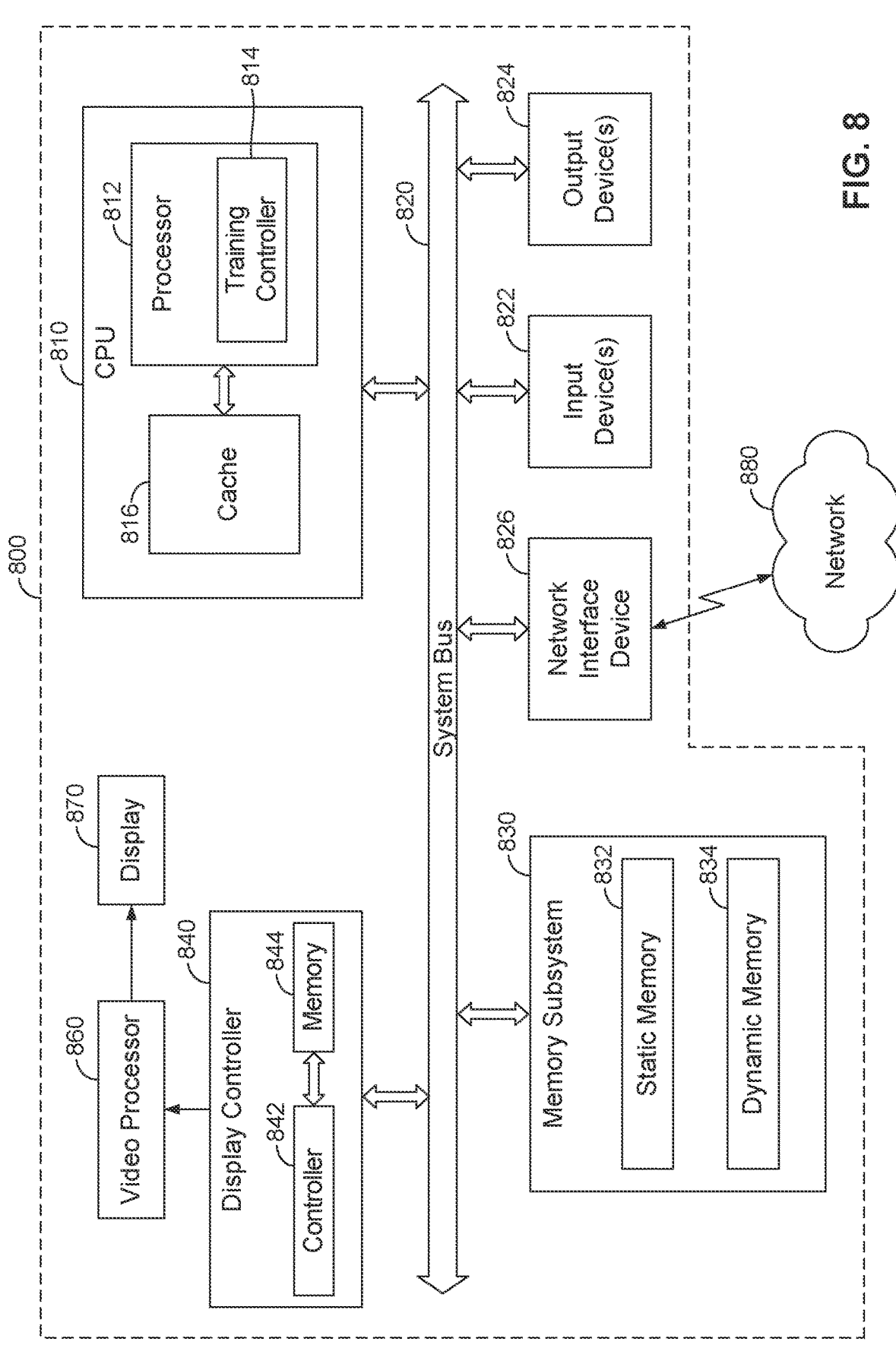
FIG. 8 is a diagram illustrating an example system that may support memory device high-speed interface training, in accordance with the present disclosure.

FIG. 8 is a diagram illustrating an example system 800 that may support memory device high-speed interface training, in accordance with the present disclosure. More particularly, as described herein, the memory device high-speed training mechanisms and the corresponding methods or processes described herein can be employed in any circuit, including but not limited to a microprocessor-based circuit, system, or others suitable electronic device. For example, electronic devices that can include or otherwise employ the memory device high-speed interface training mechanisms described herein can comprise, without limitation, mobile phones, cellular phones, computers, portable computers, desktop computers, personal digital assistants (PDAs), monitors, computer monitors, televisions, tuners, radios, satellite radios, digital music players, portable music players, digital video players, digital video disc (DVD) players, portable digital video players, or the like.

For example, in some aspects, FIG. 8 illustrates an example system 800 that can employ the memory device high-speed interface training mechanisms and corresponding methods and/or processes described in further detail herein. For example, as shown in FIG. 8, the system 800 may include a CPU 810 that includes a cache 816 and a processor 812, which may include a training controller 814 configured to perform one or more operations described herein in connection with FIGS. 4 and 5A-5B. Furthermore, although FIG. 8 illustrates that the training controller 814 is included in the processor 812, the training controller 814 may reside at any suitable location within the system 800, such as within an integrated circuit that is controlled using dynamic voltage and frequency scaling (DVFS) techniques and/or on an external integrated circuit. Additionally, or alternatively, the training controller 814 may be configured to perform one or more processes described herein, such as process 600 of FIG. 6 and/or process 700 of FIG. 7. Additionally, or alternatively, one or more components shown in FIG. 8 may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

In some aspects, the training controller 814 may be configured to perform an initial training operation for a high-speed interface of the memory device; detect, after a completion of the initial training operation for the high-speed interface, whether an aging counter associated with the high-speed interface has expired; and initiate one or more re-training operations for the high-speed interface based at least in part on whether the aging counter has expired. Additionally, or alternatively, the training controller 814 may be configured to detect that the memory device is in an idle state; and perform a micro-training operation for a high-speed interface of the memory device in accordance with the memory device being in the idle state, wherein the micro-training operation includes a portion of a training operation for the high-speed interface that is less than an entirety of the training operation for the high-speed interface.

In some aspects, the CPU 810 may be coupled to a system bus 820, which may intercouple various other devices or components included in the system 800. The CPU 810 may exchange address, control, and data information over the system bus 820 to communicate with the other devices or components included in the system 800. For example, as illustrated in FIG. 8, the devices or components included in the system 800 can include a memory subsystem 830 that can include static memory 832 and/or dynamic memory 834, one or more input devices 822, one or more output devices 824, a network interface device 826, and a display controller 840. In various embodiments, the input devices 822 can include any suitable input device type, such as input keys, switches, voice processors, or the like. The output devices 824 can similarly include any suitable output device type, such as audio, video, other visual indicators, or the like. The network interface device 826 can be any device configured to allow exchange of data to and from a network 880, which may comprise any suitable network type, including but not limited to a wired or wireless network, private or public network, a local area network (LAN), a wide local area network (WLAN), and the Internet. The network interface device 826 can support any type of communication protocol desired. The CPU 810 can access the memory subsystem 830 over the system bus 820.

In some aspects, the CPU 810 can also access the display controller 840 over the system bus 820 to control information sent to a display 870. The display controller 840 can include a memory controller 842 and memory 844 to store data to be sent to the display 870 in response to communications with the CPU 810. The display controller 840 sends information to the display 870 to be displayed via a video processor 860, which processes the information to be displayed into a format suitable for the display 870. The display 870 can include any suitable display type, including but not limited to a cathode ray tube (CRT), a liquid crystal display (LCD), a plasma display, or the like.

As indicated above, FIG. 8 is provided as an example. Other examples may differ from what is described with regard to FIG. 8.

The following provides an overview of some Aspects of the present disclosure:

Aspect 1: A method performed by a memory device, comprising: detecting whether an aging counter associated with a high-speed interface of the memory device has expired; and initiating one or more re-training operations for the high-speed interface based at least in part on whether the aging counter has expired.

Aspect 2: The method of Aspect 1, further comprising performing an initial training operation for the high-speed interface of the memory device, wherein detecting whether the aging counter associated with the high-speed interface has expired comprises detecting, after a completion of the initial training operation for the high-speed interface, whether the aging counter associated with the high-speed interface has expired.

Aspect 3: The method of any of Aspects 1-2, further comprising storing one or more results of the one or more re-training operations in a flash memory of the memory device.

Aspect 4: The method of Aspect 3, further comprising performing a standard boot for the memory device using the one or more results of the one or more re-training operations.

Aspect 5: The method of any of Aspects 1-4, wherein initiating the one or more re-training operations based at least in part on whether the aging counter has expired comprises performing a re-training operation for the high-speed interface based at least in part on detecting that the aging counter has expired.

Aspect 6: The method of Aspect 5, further comprising: detecting, after a completion of the re-training operation, that the aging counter has expired; and performing another re-training operation for the high-speed interface based at least in part on detecting that the aging counter has expired.

Aspect 7: The method of any of Aspects 1-6, wherein the initial training operation for the high-speed interface is performed after an initial boot of the memory device.

Aspect 8: The method of any of Aspects 1-7, wherein the one or more re-training operations are performed using a micro-controller associated with the memory device.

Aspect 9: The method of any of Aspects 1-8, wherein the one or more re-training operations are performed using a hardware built-in self-test engine associated with the memory device.

Aspect 10: The method of any of Aspects 1-9, wherein detecting whether the aging counter has expired comprises checking whether the aging counter has expired in accordance with an interval.

Aspect 11: The method of any of Aspects 1-10, wherein detecting whether the aging counter has expired comprises checking whether the aging counter has expired in accordance with a standard boot for the memory device.

Aspect 12: The method of any of Aspects 1-11, wherein the high-speed interface is a double data rate (DDR) interface.

Aspect 13: The method of Aspect 12, wherein the initial training operation is a DDR training operation and the one or more re-training operations are one or more DDR re-training operations.

Aspect 14: The method of any of Aspects 1-13, wherein the memory device is a very-large-scale integration memory device.

Aspect 15: The method of any of Aspects 1-14, wherein a re-training operation of the one or more re-training operations is performed in-field over a time period that is less than two seconds.

Aspect 16: A method performed by a memory device, comprising: detecting that the memory device is in an idle state; and performing a micro-training operation for a high-speed interface of the memory device in accordance with the memory device being in the idle state, wherein the micro-training operation includes a portion of a training operation for the high-speed interface that is less than an entirety of the training operation for the high-speed interface.

Aspect 17: The method of Aspect 16, wherein performing the micro-training operation comprises performing a plurality of micro-training operations for a plurality of training categories associated with the high-speed interface.

Aspect 18: The method of Aspect 17, wherein the plurality of training categories associated with the high-speed interface include a duty cycle calibration category, a write training category, and a read training category.

Aspect 19: The method of any of Aspects 16-18, wherein performing the micro-training operation comprises performing a plurality of micro-training operations for a plurality of frequencies associated with transferring data using the high-speed interface.

Aspect 20: The method of any of Aspects 16-19, wherein the idle state is associated with a time period that is outside of a mission mode of the memory device.

20

Aspect 21: The method of any of Aspects 16-20, wherein the idle state is associated with a time period during which the memory device is not transmitting data to another device or receiving data from another device.

Aspect 22: The method of any of Aspects 16-21, further comprising combining a plurality of micro-training operations performed by the memory device during one or more idle states.

Aspect 23: The method of Aspect 22, further comprising saving a plurality of results associated with the plurality of micro-training operations in a register associated with the high-speed interface.

Aspect 24: The method of any of Aspects 16-23, wherein the micro-training operation is associated with a re-training of the memory device that occurs after an initial boot of the memory device.

Aspect 25: The method of any of Aspects 16-24, wherein the high-speed interface is a double data rate (DDR) interface.

Aspect 26: The method of any of Aspects 16-25, wherein the memory device is a very-large-scale integration memory device.

Aspect 27: The method of any of Aspects 16-26, wherein the micro-training operation is performed using a micro-controller associated with the memory device.

Aspect 28: The method of any of Aspects 16-27, wherein the micro-training operation is performed using a hardware built-in self-test engine associated with the memory device.

Aspect 29: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-28.

Aspect 30: An apparatus for wireless communication at a device, the apparatus comprising one or more memories and one or more processors coupled to the one or more memories, the one or more processors configured to cause the device to perform the method of one or more of Aspects 1-28.

Aspect 31: An apparatus for wireless communication, the apparatus comprising at least one means for performing the method of one or more of Aspects 1-28.

Aspect 32: A non-transitory computer-readable medium storing code for wireless communication, the code comprising instructions executable by one or more processors to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

Aspect 34: A device for wireless communication, the device comprising a processing system that includes one or more processors and one or more memories coupled with the one or more processors, the processing system configured to cause the device to perform the method of one or more of Aspects 1-28.

Aspect 35: An apparatus for wireless communication at a device, the apparatus comprising one or more memories and one or more processors coupled to the one or more memories, the one or more processors individually or collectively configured to cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A memory device, comprising:
one or more memories; and
one or more processors, coupled to the one or more memories, configured to:
perform an initial training operation for a high-speed interface;
detect, after a completion of the initial training operation for the high-speed interface, whether an aging counter associated with the high-speed interface of the memory device has expired; and
initiate one or more re-training operations for the high-speed interface based at least in part on whether the aging counter has expired.

2. The memory device of claim 1, wherein the one or more processors are further configured to store one or more results of the one or more re-training operations in a flash memory of the memory device.

3. The memory device of claim 2, wherein the one or more processors are further configured to perform a standard boot for the memory device using the one or more results of the one or more re-training operations.

4. The memory device of claim 1, wherein the one or more processors, to initiate the one or more re-training operations based at least in part on whether the aging counter has expired, are configured to perform a re-training operation for the high-speed interface based at least in part on detecting that the aging counter has expired.

5. The memory device of claim 4, wherein the one or more processors are further configured to:
detect, after a completion of the re-training operation, that the aging counter has expired; and
perform another re-training operation for the high-speed interface based at least in part on detecting that the aging counter has expired.

6. The memory device of claim 1, wherein the initial training operation for the high-speed interface is performed after an initial boot of the memory device.

7. The memory device of claim 1, wherein the one or more re-training operations are performed using a micro-controller associated with the memory device.

8. The memory device of claim 1, wherein the one or more re-training operations are performed using a hardware built-in self-test engine associated with the memory device.

9. The memory device of claim 1, wherein the one or more processors, to detect whether the aging counter has expired, are configured to check whether the aging counter has expired in accordance with an interval.

10. The memory device of claim 1, wherein the one or more processors, to detect whether the aging counter has expired, are configured to check whether the aging counter has expired in accordance with a standard boot for the memory device.

11. The memory device of claim 1, wherein the high-speed interface is a double data rate (DDR) interface.

12. The memory device of claim 11, wherein the initial training operation is a DDR training operation and the one or more re-training operations are one or more DDR re-training operations.

13. The memory device of claim 1, wherein the memory device is a very-large-scale integration memory device.

14. The memory device of claim 1, wherein a re-training operation of the one or more re-training operations is performed in-field over a time period that is less than two seconds.

15. A memory device, comprising:

one or more memories; and one or more processors, coupled to the one or more memories, configured to:

perform an initial training operation for a high-speed interface;

detect, after a completion of the initial training operation for the high-speed interface, that the memory device is in an idle state; and perform a micro-training operation for the high-speed interface of the memory device in accordance with the memory device being in the idle state, wherein the micro-training operation includes a portion of a training operation for the high-speed interface that is less than an entirety of the training operation for the high-speed interface.

16. The memory device of claim 15, wherein the one or more processors, to perform the micro-training operation, are configured to perform a plurality of micro-training operations for a plurality of training categories associated with the high-speed interface.

17. The memory device of claim 16, wherein the plurality of training categories associated with the high-speed interface include a duty cycle calibration category, a write training category, and a read training category.

18. The memory device of claim 15, wherein the one or more processors, to perform the micro-training operation, are configured to perform a plurality of micro-training operations for a plurality of frequencies associated with transferring data using the high-speed interface.

19. The memory device of claim 15, wherein the idle state is associated with a time period that is outside of a mission mode of the memory device.

20. The memory device of claim 15, wherein the idle state is associated with a time period during which the memory device is not transmitting data to another device or receiving data from another device.

21. The memory device of claim 15, wherein the one or more processors are further configured to combine a plurality of micro-training operations performed by the memory device during one or more idle states.

22. The memory device of claim 21, wherein the one or more processors are further configured to save a plurality of results associated with the plurality of micro-training operations in a register associated with the high-speed interface.

23. The memory device of claim 15, wherein the micro-training operation is associated with a re-training of the memory device that occurs after an initial boot of the memory device.

24. The memory device of claim 15, wherein the high-speed interface is a double data rate (DDR) interface.

25. The memory device of claim 15, wherein the memory device is a very-large-scale integration memory device.

26. The memory device of claim 15, wherein the micro-training operation is performed using a micro-controller associated with the memory device.

27. The memory device of claim 15, wherein the micro-training operation is performed using a hardware built-in self-test engine associated with the memory device.

28. A method performed by a memory device, comprising:

performing an initial training operation for a high-speed interface;

detecting, after a completion of the initial training operation for the high-speed interface, whether an aging counter associated with the high-speed interface of the memory device has expired; and initiating one or more re-training operations for the high-speed interface based at least in part on whether the aging counter has expired.

29. A method performed by a memory device, comprising:

performing an initial training operation for a high-speed interface;

detecting, after a completion of the initial training operation for the high-speed interface, that the memory device is in an idle state; and performing a micro-training operation for the high-speed interface of the memory device in accordance with the memory device being in the idle state, wherein the micro-training operation includes a portion of a training operation for the high-speed interface that is less than an entirety of the training operation for the high-speed interface.

* * * * *